Patented May 15, 1934

1,958,706

UNITED STATES PATENT OFFICE 1,958,706

PROTECTIVE COATING

Neil S. Kocher, Rochester, N. Y., assignor to Eastman Kodak Company, Rochester, N. Y., a corporation of New York No Drawing. Application April 16, 1930, Serial No. 444,874

9 Claims. (Cl. 91—68)

This invention relates to lacquers and protective coatings thereof and more particularly relates to a protective coating comprising a basic coating of cellulose-ester lacquer, varnish, paint and particularly of cellulose nitrate lacquer, an intermediate coating containing a cellulose derivative and an overcoating containing an organic derivative of cellulose, such as cellulose acetate.

The use of cellulose nitrate lacquers, either clear or pigmented, in the various industries has developed to large proportions and is a field which has been of great assistance to other manufacturers in adapting their products to new or better uses. For instance, in the automobile industry, the use of pigmented cellulose nitrate lacquers has replaced the older use of varnish and paint and has not only greatly increased production, but has resulted in a protective coating which has great utility. However, one important defect exists in the use of nitrate lacquers where the surface is to be exposed to sunlight, rain, snow and other elements. While nitrate lacquer may have a brilliant surface when applied and polished, it has been found that upon exposure to the elements for even a short time, such as two or three months, a chalky surface will develop in the lacquer which cannot even be remedied by the ordinary polish. In fact, the only way that is known to bring such a surface back to its original gloss is by the tedious and laborious use of an abrasive polish which will cut away the chalky surface and expose a portion of the cellulose nitrate lacquer which has been unaffected by the elements.

It has been discovered, as set forth in the application of Paul C. Seel, Serial No. 425,353, that cellulose nitrate lacquer surfaces can be made more durable by the application thereto of an overcoating of cellulose acetate or other cellulose organic derivative. A cellulose acetate overcoating, or other cellulose organic derivative overcoating, will retain its gloss, toughness and resiliency for a much longer period than a nitrate coating, due to its much slower rate of decomposition when exposed to the elements. This overcoating is preferably a clear coating, it being most satisfactory to incorporate any pigment that may be needed into the basic coating, although it is possible to incorporate pigments into the other coating. Although such procedure protects the nitrate undercoating and gives a more satisfactory protective surface than cellulose nitrate lacquer alone will give, some difficulty has been experienced after relatively long periods of exposure in that the cellulose acetate coating may blister or peel away from the nitrate lacquer undercoating.

I have discovered that the cause for the more or less ineffective adherence of the cellulose acetate coating to the cellulose nitrate undercoating is probably attributable to the fact that the cellulose nitrate lacquer undercoating contains certain resins, gums and oils with which the cellulose acetate overcoating is not always completely compatible. In remedying this defect, I have found that an intermediate coating of a clear cellulose derivative solution, either with or without certain suitable plasticizers or softening agents, which coating is compatible with both the basic coating and the overcoating, will form an intermediate shield or bond for the basic nitrate lacquer coating and the cellulose acetate overcoating.

I have found particularly that the most satisfactory intermediate coating to employ is a solution of cellulose nitrate to which is added a plasticizer which is not only compatible with cellulose nitrate but is also compatible with cellulose acetate. While a mere solution of cellulose nitrate gives results which are satisfactory for certain purposes, such a solution when hardened or set, lacks the proper flexibility for use upon most articles, such as those which are subjected to bending or expansion stresses. Accordingly, I have obtained the best results by employing a solution of cellulose nitrate to which has been added a plasticizer coming within the class of those above defined. The solvents employed are those which will give a solution suitable for application by an ordinary lacquer spray gun, or by the brushing or dipping methods.

As plasticizers for the intermediate cellulose nitrate coating I have found several to be satisfactory. For instance, tricresyl phosphate, in rather wide proportions, may be employed, such as from approximately 5 to 10% up to as much as 70 or 75% of the weight of the cellulose nitrate employed. I have also found that somewhat similar proportions of triphenyl phosphate, diethyl phthalate, dibutyl phthalate, beta methoxy ethyl phthalate, phenyl benzoate or glyceryl butyl phthalate may be employed. It is, of course, known to those skilled in the art that the plasticizing effect of such compounds usually varies approximately in proportion to the amount added, so that the amount of plasticizer added may be varied to suit any desired condition.

Although I have found that cellulose nitrate solutions operate most satisfactorily as an intermediate coating, I am also cognizant of the fact that other cellulose derivatives may be employed with a certain degree of success, so long as the derivative selected is compatible with both the cellulose nitrate basic coating and the overcoating of cellulose organic derivative. For instance, mixtures of cellulose nitrate and cellulose acetate, or cellulose nitro-acetates containing sufficient nitrogen to impart to the derivative the above desirable quality, could be employed as well as cellulose ethers. The higher organic derivatives of cellulose, such as, for instance, cellulose propionate, cellulose aceto-propionate or other mixed esters or ether-esters of cellulose may be employed.

The basic nitrocellulose coating which may be employed is practically immaterial to my invention, inasmuch as it has been the purpose thereof to employ with the usual cellulose nitrate lacquer formulas which are employed in the industry, an intermediate coating which not only protects the cellulose acetate overcoating from the incompatible constituents of basic coating of cellulose nitrate lacquer but binds the former to the latter. In fact, my invention is applicable to the protection of various basic coatings, such as coatings of paint, varnish and the like, it being merely necessary that the intermediate coating applied thereto be compatible with both the basic coating and the overcoating of cellulose acetate or other organic derivative of cellulose. However, it may be stated that a suitable formula for the cellulose nitrate lacquer basic coating may be as follows: Ten ounces of one-half second nitrocotton, 5 ounces ester gum and 8 ounces of blown castor oil are dissolved in a quantity of solvent, sufficient to make a solution of one gallon, said solvent consisting of approximately 25% ethylene glycol monoethyl ether (known in the trade as cellosolve), 37% toluol, 23% xylol and 15% ethyl alcohol. Into this solvent is then ground a pigment consisting of 5 ounces of carbon black and .7 ounces Prussian blue which gives a good "warm black" lacquer.

A suitable cellulose acetate lacquer to employ as the overcoating may consist approximately of 20 ounces of cellulose acetate of low viscosity, 0 to 20 ounces of resin and from 8 to 18 ounces of a suitable plasticizer dissolved in one gallon of a solvent mixture composed of approximately 25% ethyl acetate, 30% acetone, 25% ethyl lactate and 20% ethyl alcohol. The resin employed may be Kauri, Congo or Manila gum which has been treated in powdered form with 30% nitric acid at 80° C. for about 24 hours. Cellulose acetate compositions comprising such nitric acid-treated gums are claimed in my co-pending application Serial No. 503,766. Obviously numerous variations in this formula, as well as in the basic cellulose nitrate lacquer formula, may be employed, as is well known to those skilled in the art. For instance, cellulose tripropionate dissolved in the proportion of 20 ounces to a gallon of 50% ethyl acetate and 50% 1-4 dioxan, and using 12 ounces of benzyl benzoate as a softener, makes a good overcoating lacquer. Likewise, a solution composed of 20 ounces of cellulose aceto propionate and 12 ounces benzyl benzoate in a gallon of 1-4 dioxan may be used.

The clear cellulose nitrate solution which is to be used as the intermediate coating may be formulated as follows: Twenty ounces of one-half second cellulose nitrate and 0 to 14 ounces of tricresyl phosphate are dissolved so as to make a gallon of solution in a solvent composed of 50% butyl acetate and 50% toluol. Other plasticizing materials, such as those given below, may be used in substantially the same proportions,—namely, triphenyl phosphate, diethyl phthalate, dibutyl phthalate, beta methoxy ethyl phthalate, phenyl benzoate and glyceryl butyl phthalate. Any of the common lacquer solvents for the cellulose derivative may be used which produce a solution suitable to the method of application desired.

The many advantages of my invention have been at least intimated above and may be restated somewhat as follows: It permits of the application to cellulose nitrate lacquer coatings of the more lasting and durable cellulose acetate or other cellulose organic derivative coatings which in turn prevent chalking, blooming and other decomposition of the basic cellulose nitrate lacquer coating. My invention also contemplates the protection of other basic coatings, such as paint and varnish coatings, it being necessary merely to employ an intermediate coating which is compatible with both the basic coating and the overcoating of cellulose organic derivative. In other words, I have taken advantage of the fact that basic nitrocellulose and other coatings are more cheaply prepared, and make those coatings durable and weather resistant by the application thereto of a special intermediate coating and the more durable overcoating of cellulose organic derivative.

Actual tests have shown the following very interesting comparison: The ordinary cellulose nitrate lacquer will chalk and bloom upon the surface within as little as two or three months under exposure to ordinary weather conditions; cellulose acetate overcoatings will not chalk, bloom or otherwise decompose after as much as two years exposure; cellulose acetate lacquers coated directly over cellulose nitrate lacquer coatings are an improvement over the ordinary cellulose nitrate lacquer coating but blistering and peeling of the cellulose acetate coating will sometimes occur after several months of severe exposure; however, where my invention is employed,—namely, where the intermediate compatible coating is used, exposure to severe weather conditions for as long as two years or more will not deleteriously affect the protective covering, the overcoating retaining the major proportion of its gloss, flexibility and other useful properties.

What I claim as my invention, and desire to be secured by Letters Patent of the United States is:

1. An article of manufacture having a protective covering which comprises a basic coating and a cellulose fatty acid ester overcoating selected from the group consisting of cellulose acetate, cellulose acetate-propionate and cellulose propionate which is incompatible with the basic coating, said coatings being bonded together by an intermediate coating free from substances incompatible with the cellulose organic derivative and containing cellulose nitrate and a plasticizer which is compatible with the cellulose organic derivative.

2. An article of manufacture having a protective covering which comprises a basic coating and a cellulose fatty acid ester overcoating selected from the group consisting of cellulose acetate, cellulose acetate-propionate and cellulose propionate which is incompatible with the basic coating, said coatings being bonded together by an intermediate coating free from substances incompatible with the cellulose organic derivative and containing cellulose nitrate and tricresyl phosphate.

3. An article of manufacture having a protective covering which comprises a basic coating and a cellulose acetate overcoating incompatible with the basic coating, said coatings being bonded together by an intermediate coating free from substances incompatible with the cellulose aceate and containing cellulose nitrate and a plasticizer which is compatible with the cellulose acetate.

4. An article of manufacture having a protective covering which comprises a basic coating and a cellulose acetate overcoating incompatible with the basic coating, said coatings being bonded together by an intermediate coating free from substances incompatible with the cellulose acetate and containing cellulose nitrate and tricresyl phosphate.

5. An article of manufacture having a protective covering which comprises a cellulose ester basic coating and a cellulose acetate overcoating incompatible with the basic coating, said coatings being bonded together by an intermediate coating free from substances incompatible with the cellulose acetate and containing cellulose nitrate and a plasticizer which is compatible with the cellulose acetate.

6. An article of manufacture having a protective covering which comprises a cellulose ester basic coating and a cellulose acetate overcoating incompatible with the basic coating, said coatings being bonded together by an intermediate coating free from substances incompatible with the cellulose acetate and containing cellulose nitrate and tricresyl phosphate.

7. An article of manufacture having a protective covering which comprises a cellulose nitrate basic coating and a cellulose acetate overcoating incompatible with the basic coating, said coatings being bonded together by an intermediate coating free from substances incompatible with the cellulose acetate and containing cellulose nitrate and a plasticizer which is compatible with the cellulose acetate.

8. An article of manufacture having a protective covering which comprises a cellulose nitrate basic coating and a cellulose acetate overcoating incompatible with the basic coating, said coatings being bonded together by an intermediate coating free from substances incompatible with the cellulose acetate and containing cellulose nitrate and tricresyl phosphate.

9. An article of manufacture having a protective covering comprising a basic coating containing cellulose nitrate and compounds incompatible with cellulose acetate, an intermediate coating containing cellulose nitrate and a plasticizer compatible with said compounds and with cellulose acetate and free from compounds incompatible with cellulose acetate, and an overcoating containing cellulose acetate.

NEIL S. KOCHER.